Inventors.
Harold A. Meyrick, &
Walter F. Ellsworth.
By
Lee & Lee
Attys.

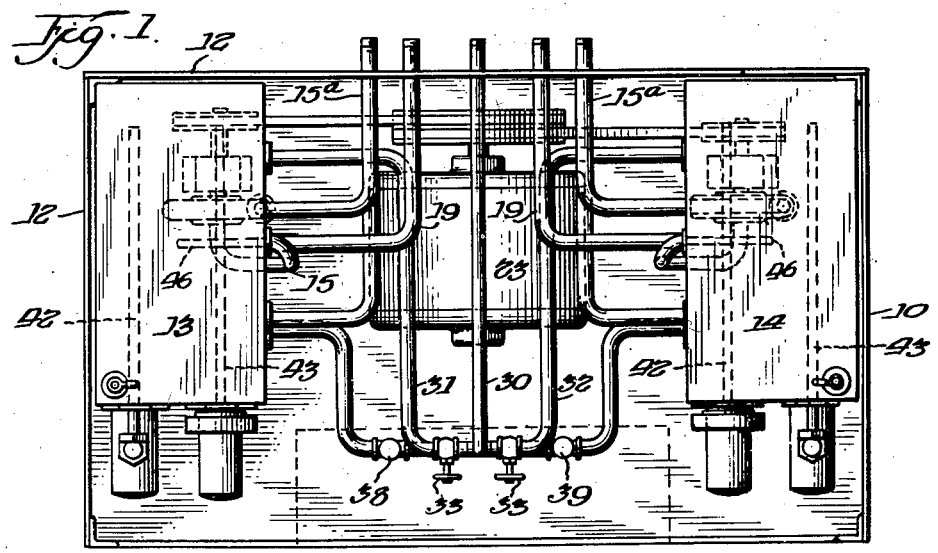
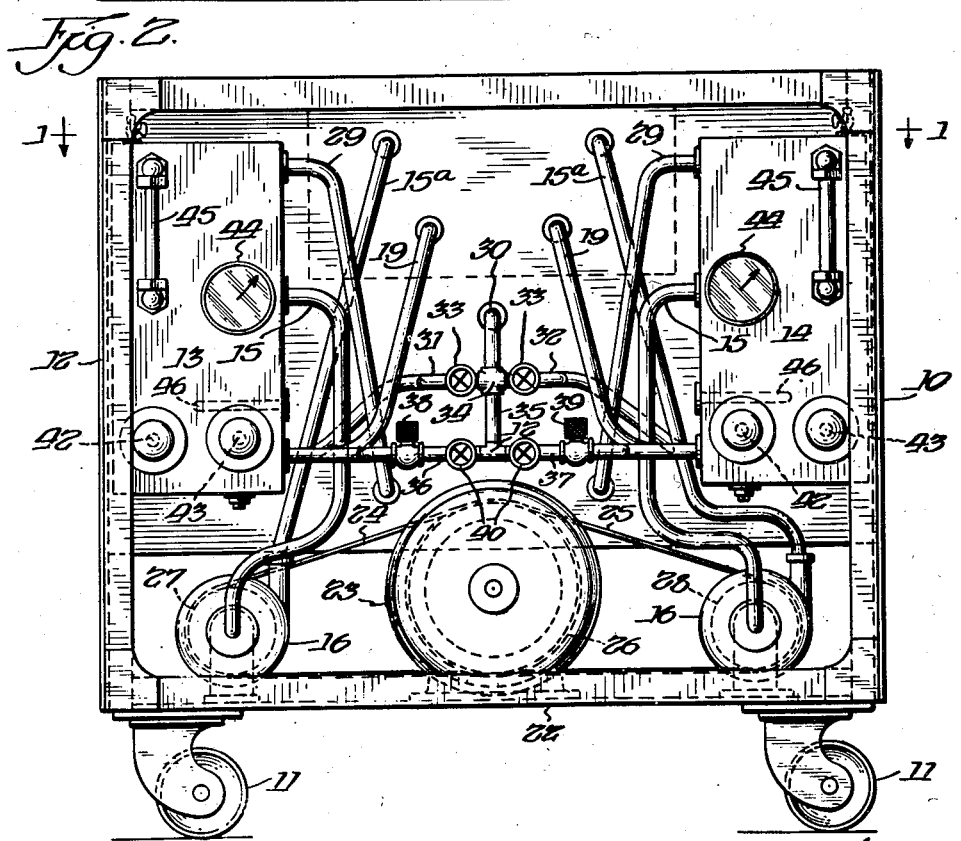

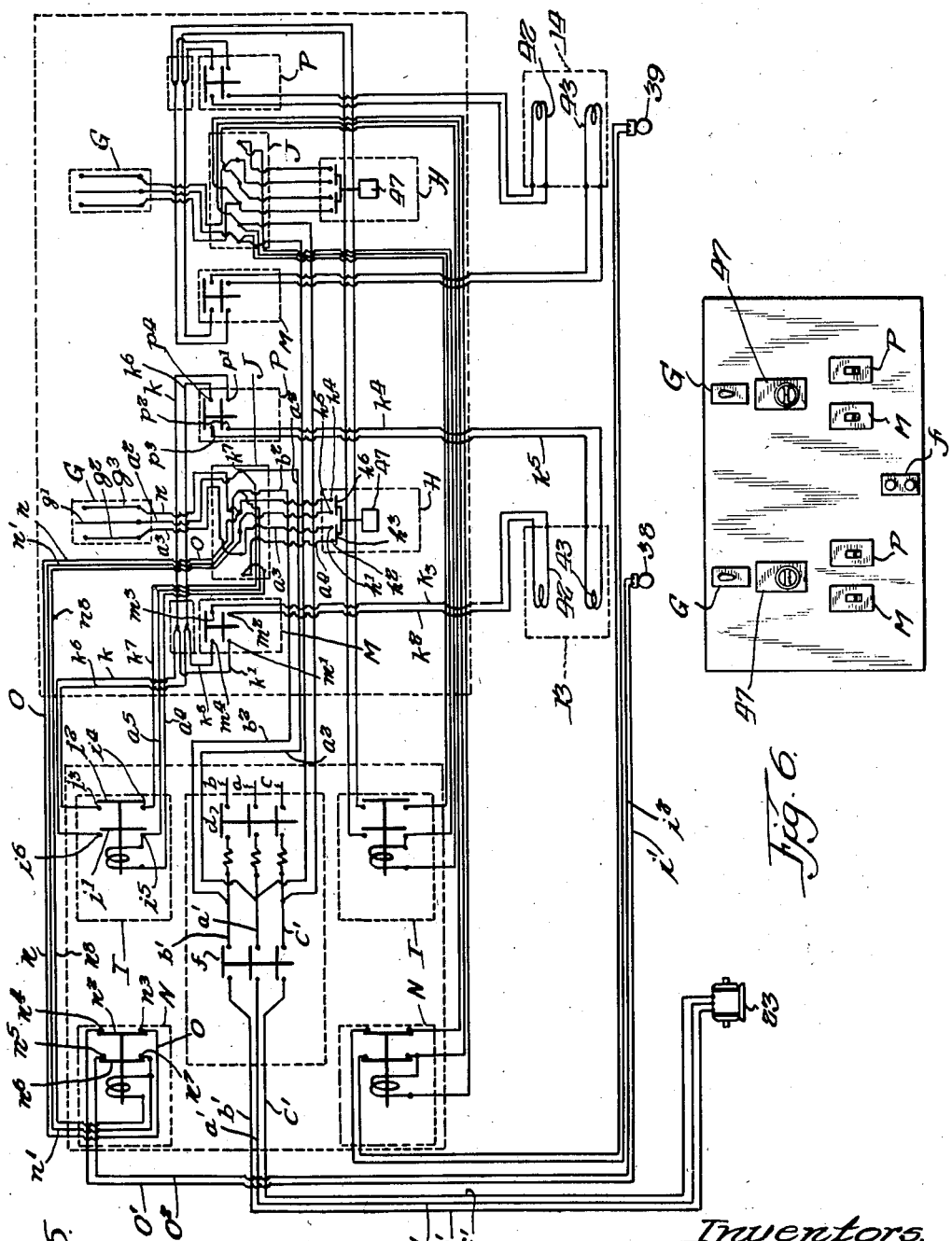

Patented Mar. 17, 1953

2,632,088

UNITED STATES PATENT OFFICE 2,632,088

MOLD TEMPERATURE CONTROL APPARATUS

Harold A. Meyrick and Walter E. Ellsworth, Indianapolis, Ind.

Application February 11, 1949, Serial No. 75,866

11 Claims. (Cl. 219—39)

This invention relates to a mold temperature control apparatus, and its principal object is to provide means to automatically control the temperature of the liquid used to heat the mold.

The invention has particular use in connection with the injection molding process of thermo-plastic materials, wherein two-part molds are employed for molding articles from liquid thermo-plastic materials injected into the mold under heavy pressure.

There are two basic conditions under which the transfer of heat must fall: One, when the natural forces of radiation, convection, and conduction are insufficient to properly dissipate the heat, or; two, when the natural forces must be retarded. In the first case, the mold will become too hot; and in the second case, the mold will not get hot enough. There are cases on record where both of these conditions have been present in the same mold: i. e., the front half of the mold operated under conditions of the first case, and the rear half of the mold operated under conditions of the second case.

The most promising method of controlling the mold temperature is by circulating water (or other liquid) through the water jackets of the mold, and by maintaining the water temperature at the level that will give the temperatures desired. Under some conditions it will be necessary to add heat to the water to maintain the temperature wanted. At other times it may be necessary to remove heat from the water since it picks up heat from the mold.

To obtain the best results in molding thermoplastic articles, the temperature of the mold must be maintained at a substantially constant level. In some cases, one section of the mold may require a different temperature than the other section, and one of the objects of this invention is to automatically and separately control the temperature of each section of the mold.

Another object is to raise the temperature of the liquid used in heating the mold in case its temperature falls below a minimum whereby to maintain a substantially constant temperature for the liquid.

Another object is the provision of means to lower the temperature of the liquid in the event its temperature rises above a maximum temperature so as to maintain a substantially constant temperature for the liquid.

With these and other objects and advantages in view, this invention consists in the several novel features of construction, arrangement, and combination of parts hereinafter fully set forth and more particularly defined in the appended claims.

The invention is clearly illustrated in the drawings accompanying this specification, in which:

Fig. 1 is a view, partly in plan and partly in horizontal section, taken substantially along the line 1—1 of Fig. 2 of a mold temperature control apparatus embodying a simple form of the present invention;

Fig. 2 is a front elevation of the apparatus with the front wall thereof removed to show the interior construction;

Fig. 5 is a diagrammatic view of the complete wiring system; and

Fig. 6 is a plan of the switch panel used in the apparatus.

Figure 3:
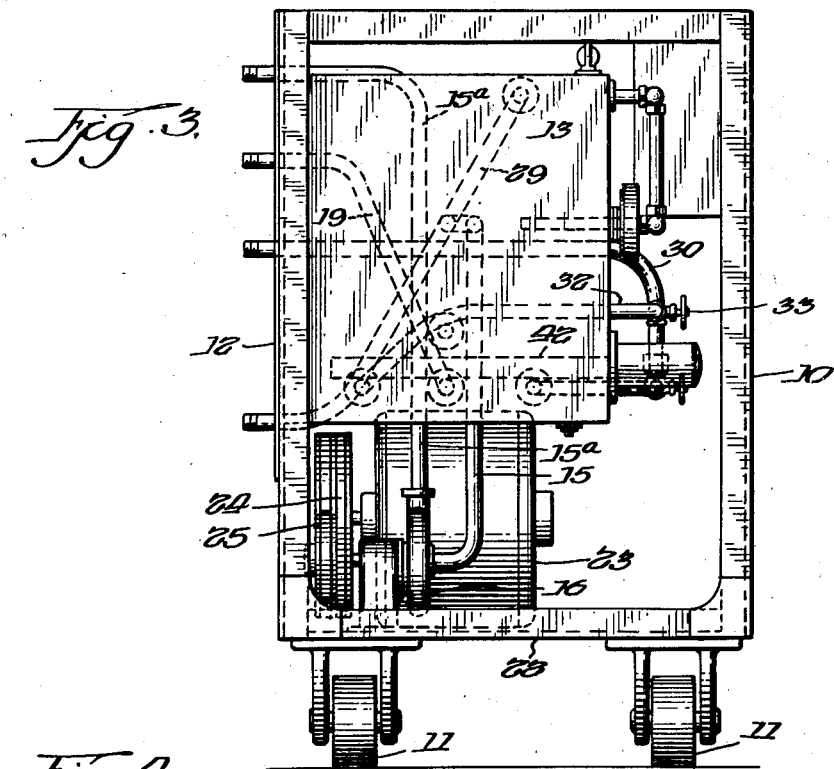
Fig. 3 is an end elevation of the apparatus with an end wall removed to show the interior construction.
Figure 4:
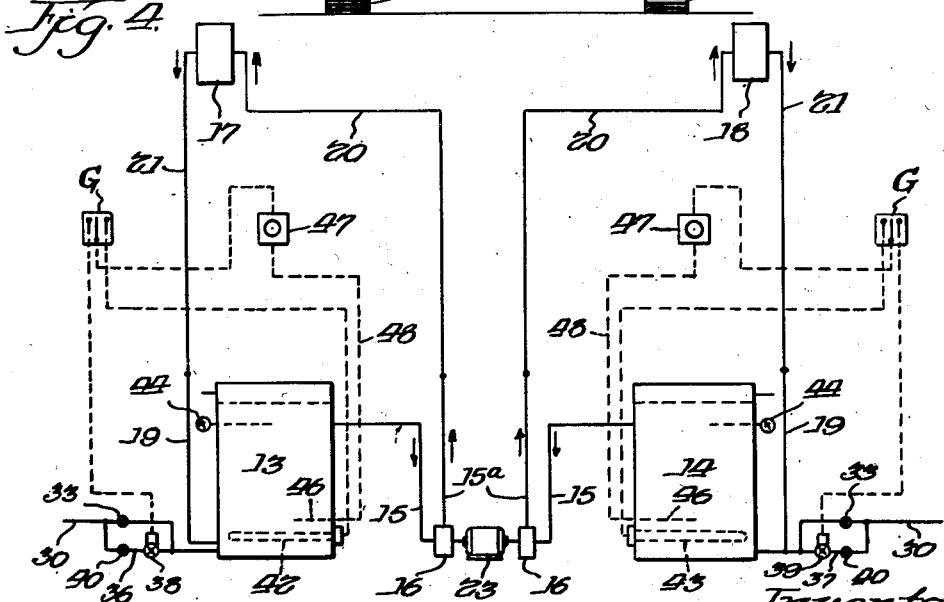
Fig. 4 is a diagrammatic view of the water circulating system and part of the wiring system.

Referring to said drawings, which are merely illustrative of one embodiment of the invention, and referring first to Figs. 1 to 3, inclusive, the reference character 10 designates a cabinet preferably mounted upon caster wheels 11 whereby it may be readily moved about. Mounted in the cabinet are two liquid supply tanks 13 and 14, from each of which extends piping 15 and 15a which leads to the exterior of the cabinet. A pump 16 in interposed in each line of piping for circulating liquid from each tank to and through the water jacket of mold sections 17 and 18 (see Fig. 4). Return pipes 19 extend from the exterior of the cabinet to the tanks 13 and 14. The ends of the piping are connected to flexible connections 20 and 21 (see Fig. 4), which lead to and from the mold section 17 and 18.

The pumps may be mounted upon the bottom wall 22 of the cabinet and are driven from a motor 23, also mounted upon the bottom wall of the cabinet. The drive connections for the pumps may comprise belts 24 and 25 trained around pulleys 26, 27, and 28 mounted respectively on the motor shaft and the pump shafts. An overflow pipe 29 is connected to the upper end of each tank and conveys surplus liquid away from the tank.

A cold water supply pipe 30 extends from without the cabinet and has two branches 31 and 32, which lead respectively to the two tanks 13 and 14 and are provided with manually operated valves 33 for manually controlling the flow of cold water to the tanks. At the intersection of the cold water pipe 30 with the branches 31 and 32 is a four-way fitting 34, and from said fitting leads a cold water branch 35 having a T fitting 12 at its lower end to which are connected two branch pipes 36 and 37, which also lead respectively to the lower ends of the two tanks. An electro-magnetically operated valve 38 or 39, such as a solenoid valve, is interposed in each branch pipe 36 and 37 and functions to automatically and separately control the admission of cold water to the tanks. Manually operated valves 40 may also be interposed in the branch pipes 36 and 37 to manually control the flow of water to the tanks.

A thermostat controls each solenoid valve and, in the event the temperature of the water in either tank rises above the maximum, the solenoid valve associated with that tank is opened by the thermostat and cold water is admitted to the tank.

In each tank is/are one or more electric heating units 42 and 43, two being shown in each tank, and these heating elements are also controlled by the thermostat. Each tank may be provided with a thermometer 44 whereby the temperature of the water in each tank may be observed, and a water glass 45 may also be provided on each tank whereby the level of the water therein may be observed.

To raise the temperature of the water in either tank in the event that the temperature thereof falls to a minimum, a thermostat bulb 46 is provided in each tank, which bulb is connected to a control thermostat 47 by a tube 48 of a small diameter (see Fig. 4), whereby the expansible fluid in the thermostat bulb actuates the control thermostat in the usual manner well known to those skilled in the art of heat control. Obviously, the control thermostat may be set so as to substantially maintain any desired or predetermined degree of temperature of the water.

To enable the heating element or elements in each tank to function when necessary and to enable the solenoid valve in each branch of the cold water pipe to function when necessary, selector switches G (see Fig. 5) are provided in connection with the control thermostat for each tank. Selector switches of the common and well-known single pole, double throw switches may be employed, and, as illustrated, each comprises two stationary contact pieces $g2$, $g3$ with a movable contact piece $g1$ therebetween, which movable contact piece can be manually thrown into contact with either stationary contact piece.

The circuits for the heating elements, the solenoid valves, and the selector switches will now be described, and inasmuch as the circuits for the two units are substantially alike, a description of the circuits for one unit will suffice for both.

Referring now to Fig. 5, the reference characters $a$, $b$, and $c$ designate the service wires, and $d$ designates a main three pole, single throw switch from which lead the free conductors $a1$, $b1$, and $c1$, which run to a motor starter $f$ and thence to the pump motor 23.

Lines $a2$, $b2$ are tapped from the main lines $a1$ and $b1$, respectively, and run to a junction board J. From the junction board the line $a2$ runs to the movable contact piece $g1$ of the selector switch G. A line $a3$ leads from the stationary contact piece $g2$ of the selector switch to a pole $h1$ of a double pole, single throw switch H which is actuated by the control thermostat 47. From the corresponding pole $h2$ of the switch H a line $a4$ runs to the winding of a normally open relay I for the heating elements 42 and 43, and from said relay winding, a line $a5$ runs to the junction board and joins the return line $b2$. With the contact pieces $g1$ and $g2$ of the selector switch closed, then whenever the contact pieces $h1$, $h2$, and $h3$ of the switch H are closed, the relay I is energized and the contact pieces $i1$ and $i2$ thereof and poles $i3$, $i4$, $i5$, and $i6$ are contacted and the circuits to the heating elements 42 and 43 are closed.

The circuits for the heating elements may be traced from the line $a2$ in the junction box, through line $k7$ to the pole $i4$ of the relay I, through contact piece $i2$ and pole $i3$ to line $k6$ which runs to the pole $p4$ of a manually operated double pole, single throw switch P. From the corresponding pole $p3$ of switch P a line $k5$ leads to the coil of the heating element 43 and from said coil a line $k4$ leads back to a pole $p2$ of switch P. From the corresponding pole $p1$ a line $k$ runs to the pole $i6$ of relay I. From the corresponding pole $i5$ line $a5$ runs back to the junction board and joins line $b2$.

From the lines $k$, $k6$ run lines $k1$ and $k8$ to the poles $m1$ and $m4$ of a second manually operated switch M, and from the corresponding poles $m2$ and $m3$ run lines $k2$ and $k3$ which lead to the coil of the heating element 42. When the movable contacts of switch M are contacted with the poles of said switch, the circuit to the heating element 42 is closed through said switch, although it is open at the relay I until the latter is energized.

The circuits for the solenoid valve 38 will now be described. When the movable contact piece $g1$ of the selector switch G is thrown into contact with the stationary contact piece $g3$, the circuits for the heating elements are opened and the circuit for the solenoid valve 38 is closed through contacts of a normally closed relay N, thereby keeping the solenoid valve normally closed. The circuit for the relay N may be traced from the stationary contact piece $g3$, through a line $n$ which leads to the junction board and thence to pole $n3$ of the normally closed relay N; thence, through contact $n2$, pole $n4$, line $o1$ to the winding of solenoid valve 38, back through line $o2$ to pole $n5$ of the relay N, through contact $n6$ and pole $n7$ to line $n1$ back to the main line $b1$. Thus it will be seen that the solenoid valve circuit is always closed except when the relay N is energized.

The line $n$ also leads to the pole $h4$ of the double pole, single throw switch H, and from a corresponding pole $h5$ a line $n8$ runs to the winding of the relay N, thence by line $n1$ back to the junction board where it joins with line $b2$ which runs back to the main line $b1$.

When the control thermostat 47 is actuated as a result of a rise in temperature of the water in the tank above a maximum, it contacts the contact piece $h6$ with the poles $h4$ and $h5$ and closes the circuit to the winding of the relay N which, being energized, opens the contacts $n2$ and $n6$ and breaks the circuit to the solenoid valve, permitting the valve to open and admit cold water to the tank with which the solenoid valve is associated.

The electric circuits for the other unit are identical with those described and are separately controlled.

*Operation*

In the operation of the apparatus, the water in the tanks is heated to the required temperature and the pump motor is started, thereby driving the pumps, which circulate the water through the jackets of the mold sections and back to the tank. One or both of the switches P and M are closed and, if the temperature of the water in either tank falls below the minimum, the control thermostat for that tank closes the circuit to the relay for that tank through the switch H, which relay closes the circuit for the heaters. When the maximum temperature of the water has been reached, the control thermostat opens the circuit to the relay.

If the temperature of the water in either tank exceeds the maximum, the movable contact piece of the selector switch for that tank is thrown into contact with the stationary contact $g3$. As has been explained, the relay controlling the circuit to the solenoid valve is a normally closed relay; consequently, normally the solenoid valve is held closed. When the control thermostat closes the switch, it closes the circuit for the relay which, now being energized, breaks the contact with the contacts and poles, thereby opening the solenoid valve circuit and permitting the solenoid valve to open and permit cold water to enter the tank and draw heat from the water. When the minimum temperature has been reached, the control thermostat opens the circuit for the relay, thereby permitting the contacts thereof to close the circuit to the solenoid valve.

From the above, it is apparent that the temperature of the water in each section of the mold may be independently controlled so that, if necessary, the water circulating through one jacket may be hotter than the other; that the temperature of the water in each jacket may be quickly raised or may be quickly lowered, as required.

Having thus described our invention, it is obvious that various immaterial modifications may be made in the same without departing from the spirit of our invention; hence, we do not wish to be understood as limiting ourselves to the exact form, construction, arrangement, and combination of parts herein shown and described or uses mentioned.

What we claim as new and desire to secure by Letters Patent is:

1. A portable mold temperature control apparatus for a molding apparatus including a two-part mold and comprising control means for separately controlling the temperature of the two-part mold of the molding apparatus and also means adapted to be connected to a source of electrical energy, said mold temperature control apparatus further comprising a liquid supply tank, an electrical heating element therein adapted to be connected to the source of electrical energy, piping leading from said tank to a mold section of the molding apparatus and back to the tank, a pump interposed in said piping, a motor for driving said pump, and said means for separately controlling the temperature of the two-part mold comprising automatic means for raising the temperature of the liquid in the tank whenever the temperature of said liquid falls to a predetermined minimum, whereby the temperature of the two-part mold of the molding apparatus is controlled within the predetermined range, depending upon the material being molded, by adding heat to the liquid and/or subtracting heat therefrom cyclically so that a predetermined and preselected temperature of the liquid is maintained.

2. A portable mold temperature control apparatus for a molding apparatus including a two-part mold and comprising control means for separately controlling the temperature of the two-part mold of the molding apparatus and also means adapted to be connected to a source of electrical energy, said mold temperature control apparatus further comprising a liquid supply tank, piping leading from said tank to a mold section and back to the tank, a pump interposed in said piping, a motor for driving said pump, a cold water supply pipe leading to said tank, a solenoid valve interposed in said cold water supply pipe, and said control means comprising automatically operating means for opening said valve whenever the temperature of the liquid in the tank exceeds a maximum, whereby the temperature of the two-part mold of the molding apparatus is controlled within a predetermined range, depending upon the material being molded, by adding heat to the liquid and/or subtracting heat therefrom cyclically so that a predetermined and preselected temperature of the liquid is maintained.

3. A mold temperature control apparatus for a molding apparatus including a two-part control and adapted for separately controlling the temperature of each mold, comprising in combination, a liquid supply tank, piping leading from said tank to a mold section and back to the tank, a pump interposed in said piping, a motor for driving said pump, automatically operating control means for raising the temperature of the liquid in the tank whenever the temperature falls to a minimum, automatically operating control means to lower the temperature of said liquid whenever the temperature thereof exceeds a maximum, and manually operated selector means to place either of said temperature control means into operation, whereby the temperature of the two-part mold of the molding apparatus is controlled within a predetermined range, depending upon the material being molded, by adding heat to the liquid and/or subtracting heat therefrom cyclically so that a predetermined and preselected temperature of the liquid is maintained.

4. A mold temperature control apparatus for a molding apparatus having a two-part mold, said mold temperature control apparatus comprising control means for separately controlling the temperature of each mold, said apparatus further comprising in combination a liquid supply tank adapted to be operatively connected to a mold of the molding apparatus, a heating element therein, piping with a pump interposed therein for circulating hot liquid from the tank to a mold section and back to the tank, a motor for driving said pump, a thermostat responsive to variations in temperature of the liquid for controlling said heating element, a cold water supply pipe leading to said tank, an electro-magnetically operated valve in said cold water supply pipe controlled by said thermostat, and a selector switch in the circuits for the heating element and the electro-magnetically operated valve whereby the temperature of the mold section is controlled within a predetermined range, depending upon the material being molded, by adding heat to the liquid and subtracting heat therefrom cyclically so that a predetermined and preselected temperature of the liquid is maintained.

5. A mold temperature control apparatus for a molding apparatus including a mold section with fluid passages therein for heating the mold section and comprising means adapted to be connected to the fluid passages, said mold temperature control apparatus further comprising in combination a liquid supply tank adapted to be operatively connected to the fluid passages of a mold section, a heating element therein, piping leading from said tank to a mold section and back to the tank, a pump interposed in said piping for circulating the liquid from the tank through the mold section, a motor for driving said pump, a thermostat responsive to fluctuations of temperature of the liquid for controlling said heating element, a cold water supply pipe leading to said tank, a solenoid valve interposed in said cold water pipe and controlled by said thermostat, and a selector switch interposed in the circuits for the heating element and the solenoid valve whereby the temperature of the mold section is controlled within a predetermined range, depending upon the material being molded, by adding heat to the liquid and subtracting heat therefrom cyclically so that a predetermined and preselected temperature of the liquid is maintained.

6. A mold temperature control apparatus for a molding apparatus including mold sections comprising control means for controlling the temperature of the mold sections and connecting means adapted to be connected to the mold sections, said apparatus further comprising in combination a liquid supply tank adapted to be operatively connected to a mold section, a heating element therein, piping with a pump interposed therein for circulating hot liquid from the tank to a mold section and back to the tank, a motor for driving said pump and said control means including a thermostat bulb responsive to variations in temperature of the liquid, a control thermostat responsive to fluctuation of the fluid in the bulb for controlling said heating element, a cold water supply pipe leading to said tank, an electro-magnetically operated valve in said cold water supply pipe controlled by said thermostat, and a selector switch in the circuits for the heating element and the electro-magnetically operated valve whereby the temperature of the mold section is controlled within a predetermined range, depending upon the material being molded, by adding heat to the liquid and subtracting heat therefrom cyclically so that a predetermined and preselected temperature of the liquid is maintained.

7. A mold temperature control apparatus for a molding apparatus for controlling the temperature of the mold sections, said apparatus comprising connecting means adapted to be connected to the mold sections, said apparatus further comprising in combination a liquid supply tank adapted to be operatively connected to a mold section by the connecting means, a heating element therein, piping leading from said tank to a mold section and back to the tank, a pump interposed in said piping, a motor for driving said pump, a thermostat bulb responsive to fluctuations of temperature of the liquid, a control thermostat actuated by fluctuations of fluid in the bulb for controlling said heating element, a cold water supply pipe leading to said tank, a solenoid valve interposed in said cold water pipe and controlled by said control thermostat and a selector switch interposed in the circuits for the heating element and the solenoid valve whereby the temperature of the mold section is controlled within a predetermined range, depending upon the material being molded, by adding heat to the liquid and subtracting heat therefrom cyclically so that a predetermined and preselected temperature of the liquid is maintained.

8. A mold temperature control apparatus adapted to be connected in heat transfer relationship to the mold sections of a molding apparatus for controlling the temperature of the mold sections and comprising in combination two liquid supply tanks adapted to be operatively connected to the respective mold sections, one for each section of a two-part mold, piping leading from each tank to a mold section and back to the tank, a pump interposed in each line of piping, a motor for driving both pumps, a heating element in each tank, a cold water supply pipe having two branches, one leading to each tank, thermostatic means for each heating element for automatically and separately raising the temperature of the liquid in each tank, thermostatically controlled electro-magnetically operated valves, one in each branch of the cold water pipe whereby the temperature of the liquid in each tank is separately and automatically lowered to maintain a substantially constant predetermined temperature of the liquid, whereby the temperature of each mold section is controlled within a predetermined range, depending upon the material being molded, by adding heat to the liquid and subtracting heat therefrom cyclically so that a predetermined and preselected temperature of the liquid is maintained for each mold section.

9. A mold temperature control apparatus adapted to be connected in heat transfer relationship to the mold sections of a molding apparatus for controlling the temperature of the mold sections and comprising in combination two liquid supply supply tanks adapted to be operatively connected to the respective mold sections, one for each section of a mold, piping leading from each tank to a section of the mold and back to the tank, pumps, one interposed in each line of piping, a motor for driving the pumps, drive connections between the motor and pumps, several heating elements in each tank, thermostats, one responsive to the temperature of the water in each tank for controlling the heating elements in the tank, electric circuits for each heating element in each tank, an electric switch in each circuit for the heating elements in each tank for closing the circuit of one heating element in each tank or both heating elements, whereby the temperature of each mold section is controlled within a predetermined range, depending upon the material being molded, by adding heat to the liquid and subtracting heat therefrom cyclically so that a predetermined and preselected temperature of the liquid is maintained for each mold section.

10. The method of controlling the temperature of a liquid for heating a mold of a molding apparatus having a two-part mold and in which the temperature is to be controlled within a predetermined range, which comprises the steps: flowing a liquid in heat exchange relationship through a mold in which the temperature is to be controlled, and controlling the temperature of the mold within a predetermined range, depending upon the material being molded, by adding heat to the liquid and/or subtracting heat therefrom cyclically, whereby a predetermined and preselected temperature of the liquid is maintained.

11. A portable mold temperature control apparatus adapted to be connected to a two-part mold of a molding apparatus, a source of electrical energy, and a source of liquid for heating the molds, comprising a supporting frame, a plurality of liquid supply tanks symmetrically positioned on the frame and adapted to be operatively connected to the two-part mold, an electrical heating element therein for each tank and adapted to be connected to the source of electrical energy, piping leading from said tanks to a mold section and back to the tanks, separate pumps for each tank symmetrically positioned on the frame and beneath each tank and interposed in said piping, a motor located intermediate said pumps for driving said pump, automatic means for each tank including thermostatic means operatively controlling each heating element for raising the temperature of the liquid in each tank whenever the temperature of said liquid falls to a predetermined minimum, a cold water supply pipe leading to each of said tanks, a solenoid valve for each of said tanks interposed in said cold water supply pipe for each of said tanks, and automatic operating means for opening each of said valves whenever the temperature of the liquid in each of the tanks exceeds a maximum, whereby the temperature of each of the molds is controlled within a predetermined range.

HAROLD A. MEYRICK.
WALTER E. ELLSWORTH.

REFERENCES CITED

The following references are of record in the file of this patent:

UNITED STATES PATENTS

| Number | Name | Date |
| --- | --- | --- |
| 1,863,522 | Fairbairn | June 14, 1932 |
| 2,107,190 | Shaw | Feb. 1, 1938 |
| 2,385,143 | Levine | Sept. 18, 1945 |